United States Patent
Pfeifer et al.

(10) Patent No.: US 10,376,094 B1
(45) Date of Patent: Aug. 13, 2019

(54) AGITATOR ASSEMBLY FOR A PORTABLE BEVERAGE DISPENSING CONTAINER

(71) Applicant: Grindmaster Corporation, Louisville, KY (US)

(72) Inventors: Thomas Joseph Pfeifer, Louisville, KY (US); William Alexis Dahmen, Goshen, KY (US)

(73) Assignee: Grindmaster Corporation, Louisville, KY (US)

( * ) Notice: Subject to any disclaimer, the term of this patent is extended or adjusted under 35 U.S.C. 154(b) by 384 days.

(21) Appl. No.: 15/378,323

(22) Filed: Dec. 14, 2016

Related U.S. Application Data (60) Provisional application No. 62/267,612, filed on Dec. 15, 2015.

(51) Int. Cl.
| | | |
|---|---|---|
| *A47J 31/00* | (2006.01) | |
| *A47J 31/46* | (2006.01) | |
| *A47J 43/046* | (2006.01) | |
| *A47J 31/44* | (2006.01) | |
| *A47J 31/50* | (2006.01) | |

(52) U.S. Cl.
CPC ......... *A47J 31/467* (2013.01); *A47J 31/4496* (2013.01); *A47J 43/0465* (2013.01); *A47J 31/50* (2013.01)

(58) Field of Classification Search
CPC .. A47J 43/0465; A47J 43/046; A47J 31/4432; A47J 31/4435; A47J 31/4496; A47J 31/4425; A47J 31/50; B01F 13/08
USPC ........ 99/348, 297; 366/274, 273; 222/146.2, 222/146.5; 220/592.28
See application file for complete search history.

(56) References Cited

U.S. PATENT DOCUMENTS

| | | | | |
|---|---|---|---|---|
| 2,655,011 A | * | 10/1953 | Ihle | B67D 3/0009 222/131 |
| 4,621,571 A | | 11/1986 | Roberts | |
| 5,816,058 A | * | 10/1998 | Lee | C02F 1/481 62/126 |

(Continued)

FOREIGN PATENT DOCUMENTS

EP    2865303 A1 *  4/2015  .......... B01F 15/0048

OTHER PUBLICATIONS

Bunn-O-Matic Corporation, "Installation & Operating Manual" for Soft Heat Server 1.0 & 1.5 Gallon, 2015.

(Continued)

*Primary Examiner* — Reginald Alexander
(74) *Attorney, Agent, or Firm* — Stites & Harbison, PLLC; David W. Nagle, Jr.; James R. Hayne (57) ABSTRACT

A portable beverage dispensing container comprises a housing and an internal beverage holding tank positioned in and contained within the housing. An intermediate drive magnet is installed in a base of the portable beverage dispensing container below and outside of the internal beverage holding tank, and a beverage agitator is positioned within the internal beverage holding tank and magnetically coupled to the intermediate drive magnet. In use, rotation of the intermediate drive magnet causes a corresponding rotation of the beverage agitator within the internal beverage holding tank. The intermediate drive magnet is configured for magnetic coupling to a drive magnet installed in a brewing station when the portable beverage dispensing container is positioned at the brewing station.

14 Claims, 6 Drawing Sheets

(56) References Cited

U.S. PATENT DOCUMENTS

| | | | |
|---|---|---|---|
| 5,907,993 A | 6/1999 | Van Camp et al. | |
| 6,119,889 A * | 9/2000 | Fujii | A47J 41/0077 |
| | | | 215/12.2 |
| 2001/0002892 A1 * | 6/2001 | Karkos, Jr. | A23G 9/045 |
| | | | 366/274 |
| 2005/0023193 A1 * | 2/2005 | Kim | C02F 1/003 |
| | | | 210/85 |
| 2008/0168906 A1 * | 7/2008 | Pan | A47J 31/20 |
| | | | 99/287 |
| 2016/0073820 A1 * | 3/2016 | Alet Vidal | A47J 36/165 |
| | | | 99/337 |
| 2016/0374503 A1 * | 12/2016 | Yoshidome | A47J 31/465 |
| | | | 99/286 |

OTHER PUBLICATIONS

Grindmaster-Cecilware, "Operator Manual" for PB330 and PB430 PrecisionBrew Digital Shuttle Brewers, 2016.
Grindmaster-Cecilware, "Operator Manual" for P200E Shuttle Brewer, 2016.

* cited by examiner

AGITATOR ASSEMBLY FOR A PORTABLE BEVERAGE DISPENSING CONTAINER

CROSS-REFERENCE TO RELATED APPLICATIONS

The present application claims priority to U.S. Patent Application Ser. No. 62/267,612 filed on Dec. 15, 2015, the entire disclosure of which is incorporated herein by reference.

BACKGROUND OF THE INVENTION

In the food service industry, the prompt availability of high quality hot beverages, predominantly coffee, is a necessity. Since customers may request such hot beverages in sporadic intervals and in varying amounts throughout the day, it has become necessary to have large volumes of fresh beverage available on demand. At the same time, it is desirable to provide beverage dispensing capabilities at a number of locations throughout a restaurant or other location so that servers or other wait staff do not need to return to the brewer to retrieve a fresh beverage.

Thus, manufacturers of coffee brewers have developed satellite (or shuttle) brewing systems. In such systems, the beverage is brewed at a central brewing station, and then transported in separate and portable beverage dispensing containers (commonly referred to as shuttles) to various convenient locations at which the beverage can be dispensed for consumption either by food service personnel or the consumer. For a further discussion of satellite brewing systems, see, for example, U.S. Pat. No. 5,907,993 issued to Van Camp, et al. and U.S. Pat. No. 4,621,571 issued to Roberts.

Often, the beverage is held in the shuttle until all of the beverage has been dispensed, frequently resulting in a holding time of multiple hours. Accordingly, there can be some settling of solids in the brewed beverage to the bottom of the internal beverage holding tank (or liner) of the shuttle, which can adversely affect the quality of the beverage. Furthermore, there can be an inconsistency in the temperature of the brewed beverage held in the shuttle as a result of inconsistent application of heat to the shuttle when it is at the brewing station.

It would thus be desirable to provide a design and construction of a portable beverage dispensing container (or shuttle) of a satellite brewing system that addresses some of these deficiencies of the prior art.

SUMMARY OF THE INVENTION

The present invention is an agitator assembly for a portable beverage dispensing container of a satellite brewing system, which agitates and mixes the brewed beverage when the portable beverage dispensing container is positioned at the brewing station.

An exemplary satellite brewing system made in accordance with the present invention generally comprises a brewing station and a portable beverage dispensing container (or shuttle). The shuttle is selectively positioned under a brew basket of the brewing station. The brewing station includes a water tank (or reservoir) with a heater configured to heat and maintain the water at a predetermined temperature. In use, a plumbing system of the brewing station delivers the hot water from the water tank to a spray head. The spray head then delivers the hot water to the brew basket, introducing the hot water into the brew basket, such that the hot water contacts and passes through a quantity of ground coffee, tea, or other beverage component to produce a brewed beverage, which moves downward under the force of gravity and through a filter, pod, or other media before being dispensed into the shuttle.

The shuttle includes a housing with an internal beverage holding tank (or liner) positioned in and contained within the housing. An agitator assembly is used to agitate and mix the brewed beverage within the internal beverage holding tank when the shuttle is positioned at the brewing station, which assists in maintaining the brewed beverage at a consistent temperature throughout the internal beverage holding tank. The agitator assembly includes an intermediate drive magnet installed in the base of the shuttle, i.e., below and outside of the internal beverage holding tank. Furthermore, the agitator assembly includes a beverage agitator that is positioned within the internal beverage holding tank. The beverage agitator is magnetically coupled to the intermediate drive magnet through a bottom wall of the internal beverage holding tank. As a result, when the shuttle is positioned at a brewing station, rotation of a drive magnet installed in the brewing station causes a corresponding rotation of the intermediate drive magnet, which causes a corresponding rotation of the beverage agitator within the internal beverage holding tank.

Such agitation and mixing of the brewed beverage not only aids in maintaining a homogenous temperature throughout the brewed beverage, but also prevents any solids from settling at the bottom of the internal beverage holding tank.

DETAILED DESCRIPTION OF THE INVENTION

The present invention is an agitator assembly for a portable beverage dispensing container of a satellite brewing system, which agitates and mixes the brewed beverage when the portable beverage dispensing container is positioned at the brewing station.

Figure 1:
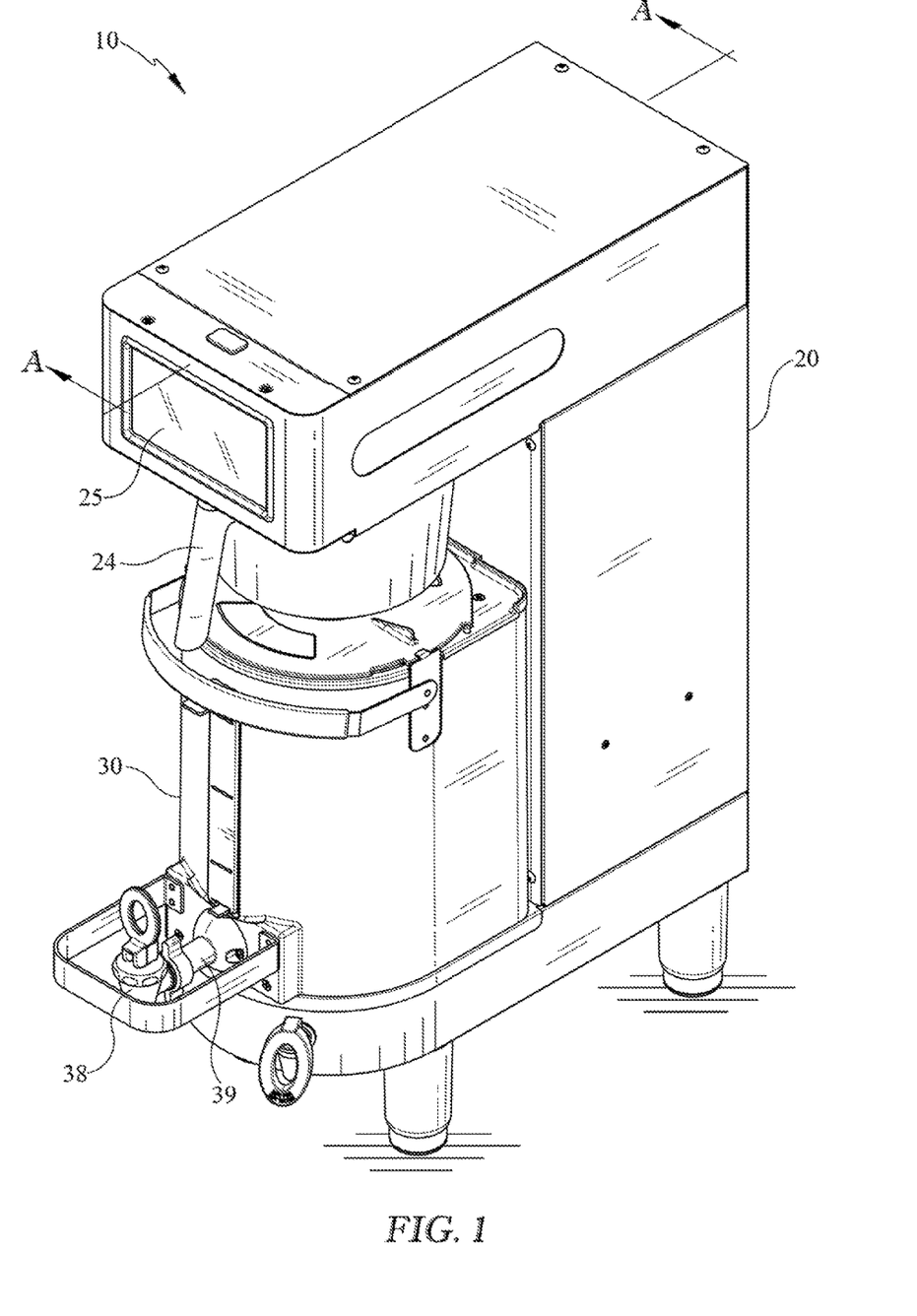
FIG. 1 is a perspective view of an exemplary satellite brewing system, including a portable beverage dispensing container made in accordance with the present invention.
Figure 2:
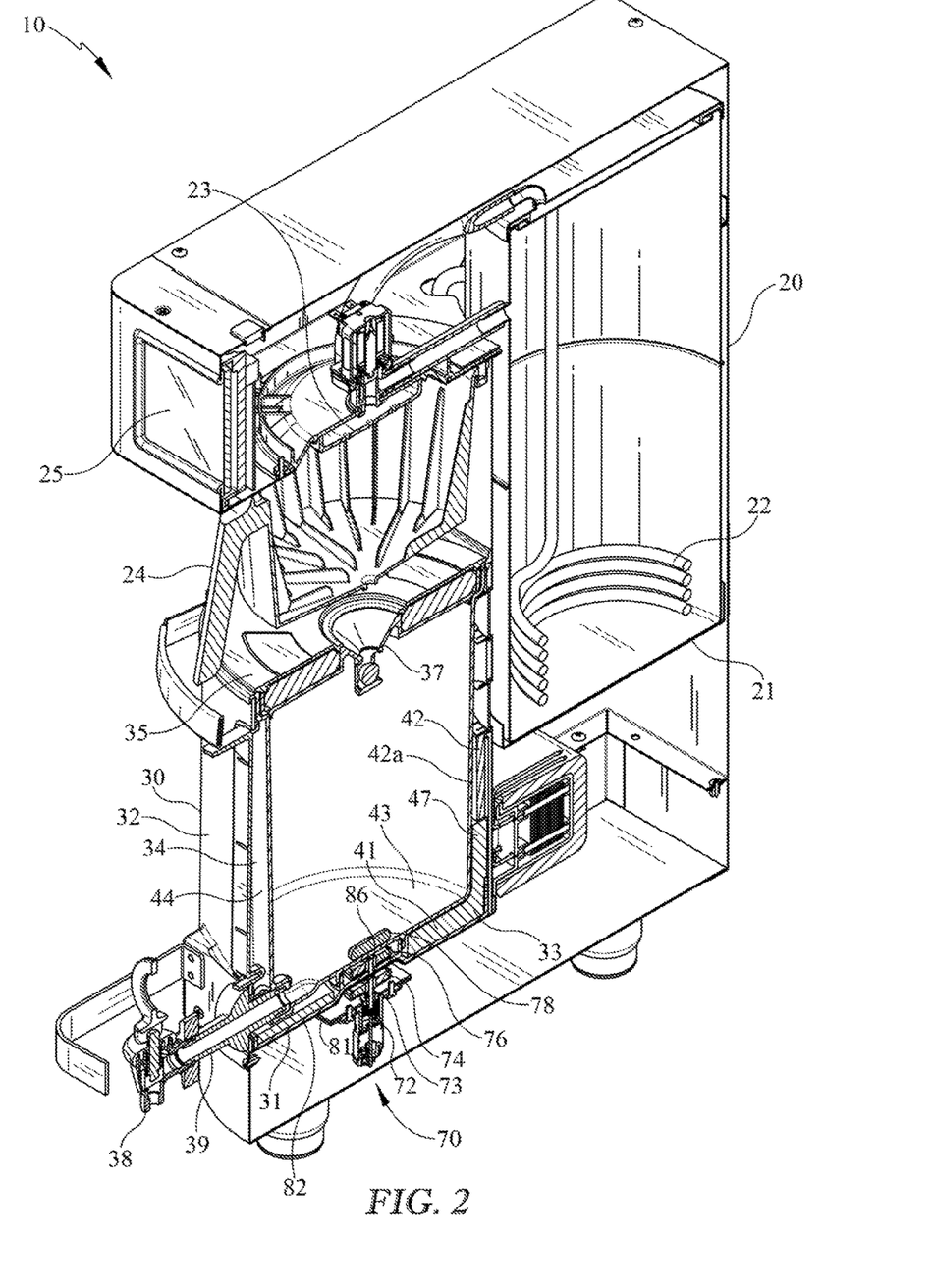
FIG. 2 is a sectional view of the exemplary satellite brewing system of FIG. 1, taken along line A-A of FIG. 1.
Figure 3:
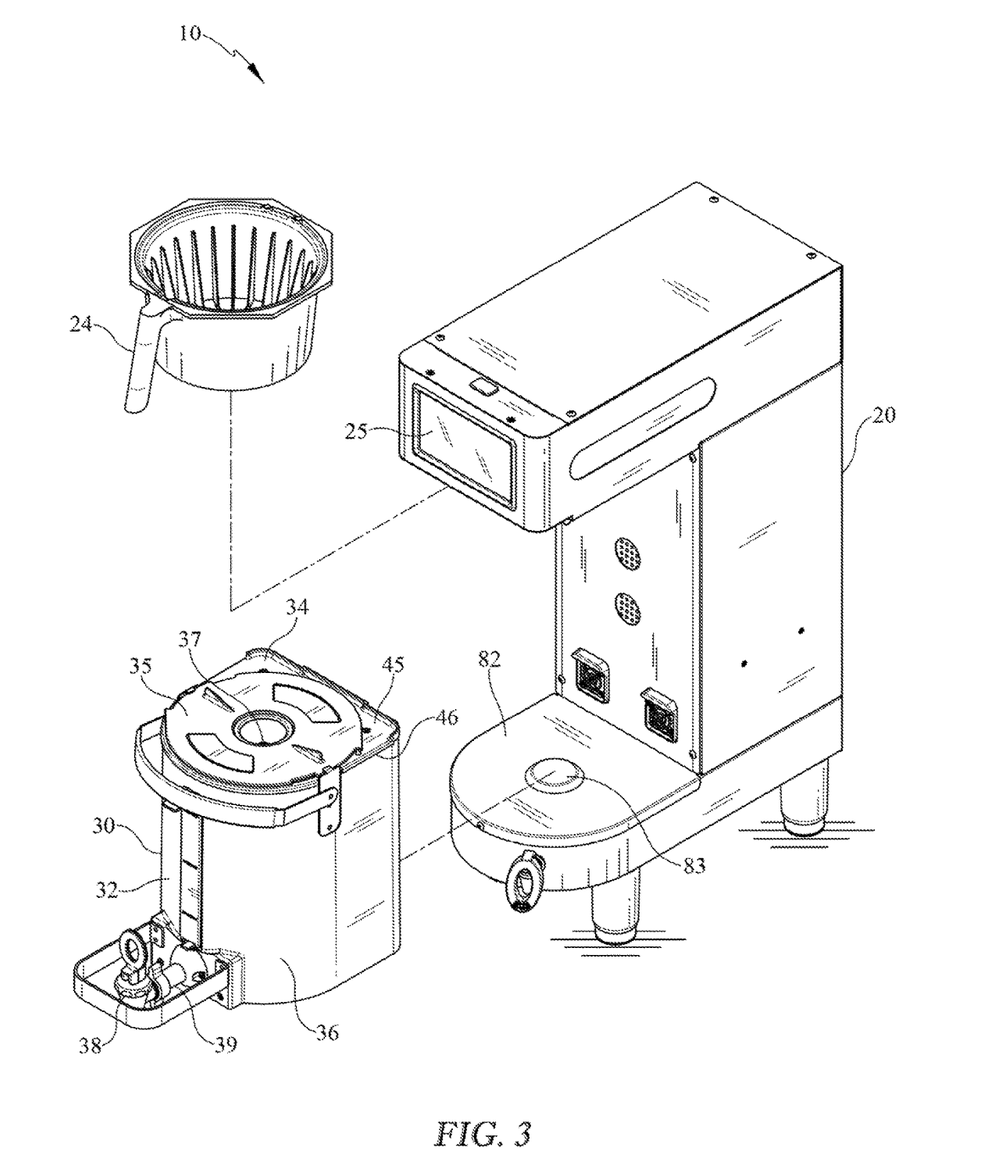
FIG. 3 is an exploded perspective view of the exemplary satellite brewing system of FIG. 1, showing the portable beverage dispensing container and brew basket separated from the brewing station.

As shown in FIGS. 1, 2 and 3, an exemplary satellite brewing system 10 made in accordance with the present invention generally comprises a brewing station 20 and a portable beverage dispensing container (or shuttle) 30. The shuttle 30 is selectively positioned under a brew basket 24 of the brewing station 20. As shown in FIG. 2, the brewing station 20 includes a water tank 21 (or reservoir) with a heater 22 configured to heat and maintain the water at a predetermined temperature. In use, a plumbing system of the brewing station 20 delivers the hot water from the water tank 21 to a spray head 23. The spray head 23 then delivers the hot water to the brew basket 24, introducing the hot water into the brew basket 24, such that the hot water contacts and passes through a quantity of ground coffee, tea, or other beverage component to produce a brewed beverage, which moves downward under the force of gravity and through a filter, pod, or other media (not shown) before being dispensed into the shuttle 30.

Figure 4:
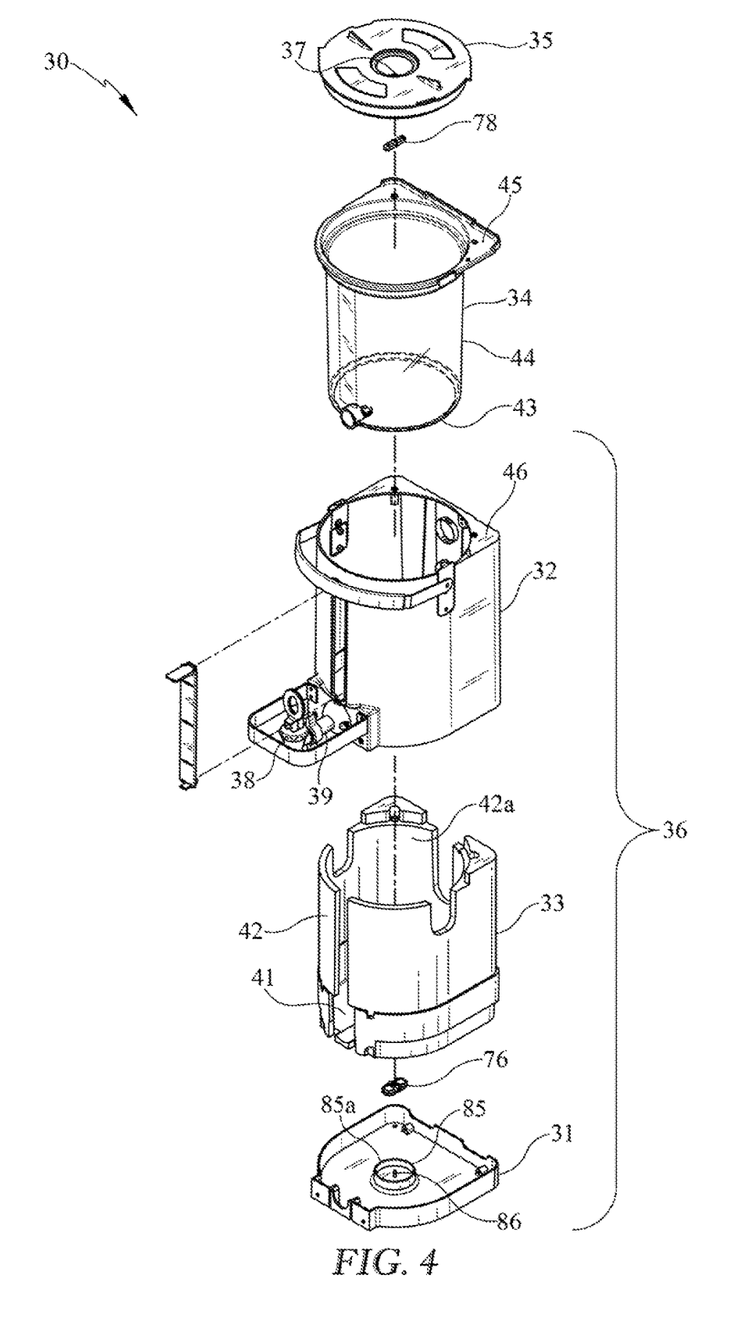
FIG. 4 is an exploded perspective view of the portable beverage dispensing container of the exemplary satellite brewing system of FIG. 1.

Referring still to FIGS. 1, 2, and 3, along with FIG. 4, the shuttle 30 includes a housing 36 with an internal beverage holding tank 34 (or liner) positioned in and contained within the housing 36. In this exemplary embodiment, and as perhaps best shown in FIG. 4, the housing 36 includes: a main body member 32, which substantially forms the sides of the housing 36; a bottom member 31, which substantially forms the bottom surface of the housing 36; and an insulating insert 33 contained substantially within the main body member 32. The bottom member 31 is removably secured to the main body member 32, so that the insulating insert 33 can be positioned and secured within the housing 36 around the internal beverage holding tank 34.

Specifically, in this exemplary embodiment, the insulating insert 33 includes a bottom wall 41 and a circumferential side wall 42, which define a generally cylindrical internal cavity 42a. The internal beverage holding tank 34 has a generally cylindrical shape with a bottom wall 43 and a circumferential side wall 44. However, the internal beverage holding tank 34 is sized such that, when the internal beverage holding tank 34 is positioned in and contained within the housing 36, the bottom wall 43 of the internal beverage holding tank 34 is at a spaced distance from the bottom wall 41 of the insulating insert 33. Similarly, the exterior surface of the side wall 44 of the internal beverage holding tank 34 is at a spaced distance from the inner surface of the side wall 42 of the insulating insert 33.

Regardless of the particular construction of the housing 36, as mentioned above, the internal beverage holding tank 34 is positioned in and contained within the housing 36. In this exemplary embodiment, an upper flange 45 of the internal beverage holding tank 34 engages an upper surface 46 of the main body member 32 of the housing 36, thus maintaining the position of the internal beverage holding tank 34 relative to the housing 36. A lid 35 is selectively positioned over the top of the internal beverage holding tank 34, with an opening 37 defined in the lid 35, through which the brewed beverage is directed from the brew basket 24 into the internal beverage holding tank 34. Brewed beverage stored in the internal beverage holding tank 34 can then be dispensed through a dispensing nozzle 38 on the external surface of the housing 36, which is in fluid communication with the internal beverage holding tank 34 via a delivery tube 39.

Figure 2A:
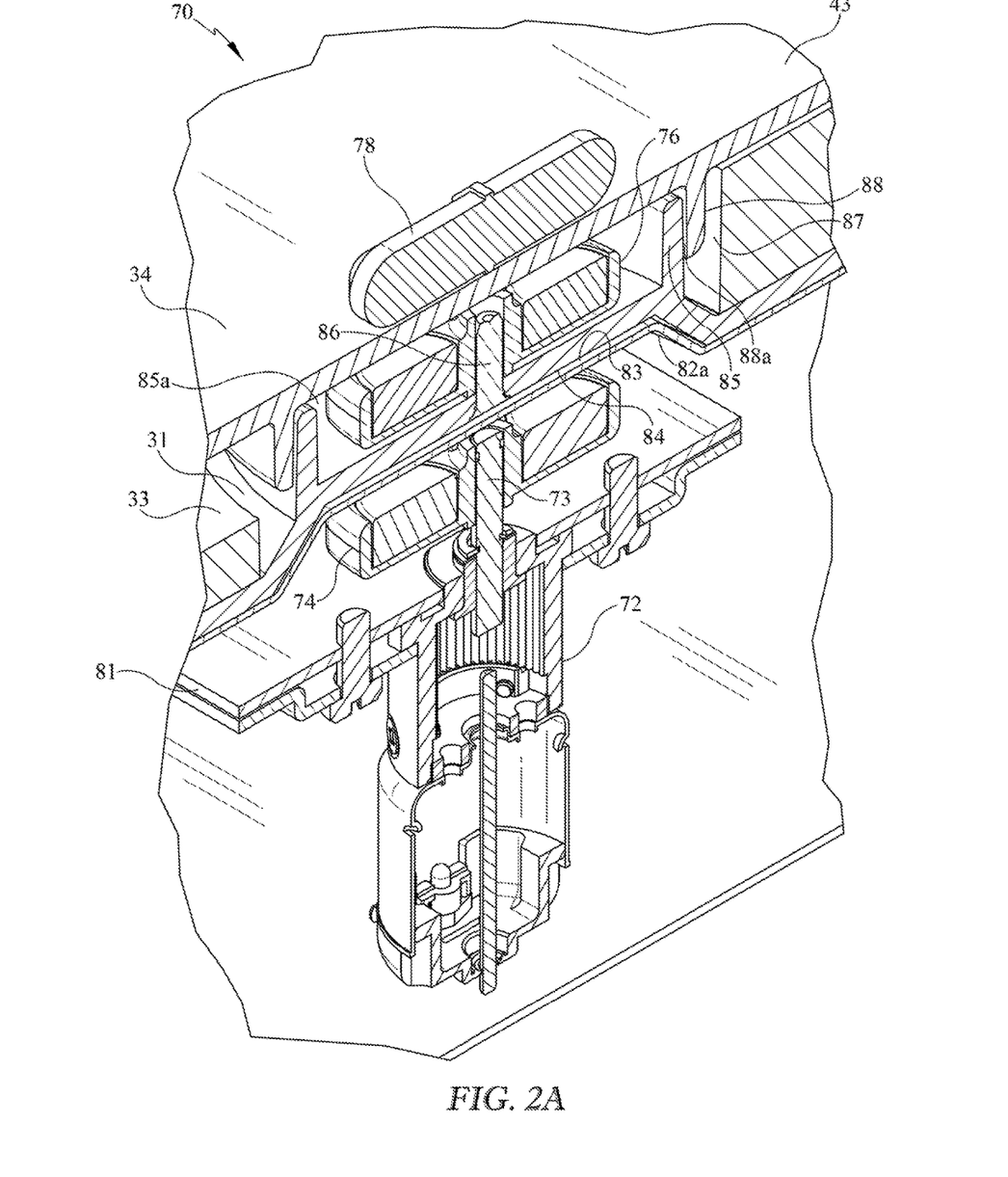
FIG. 2A is an enlarged section view of the agitator assembly shown in FIG. 2.
Figure 5:
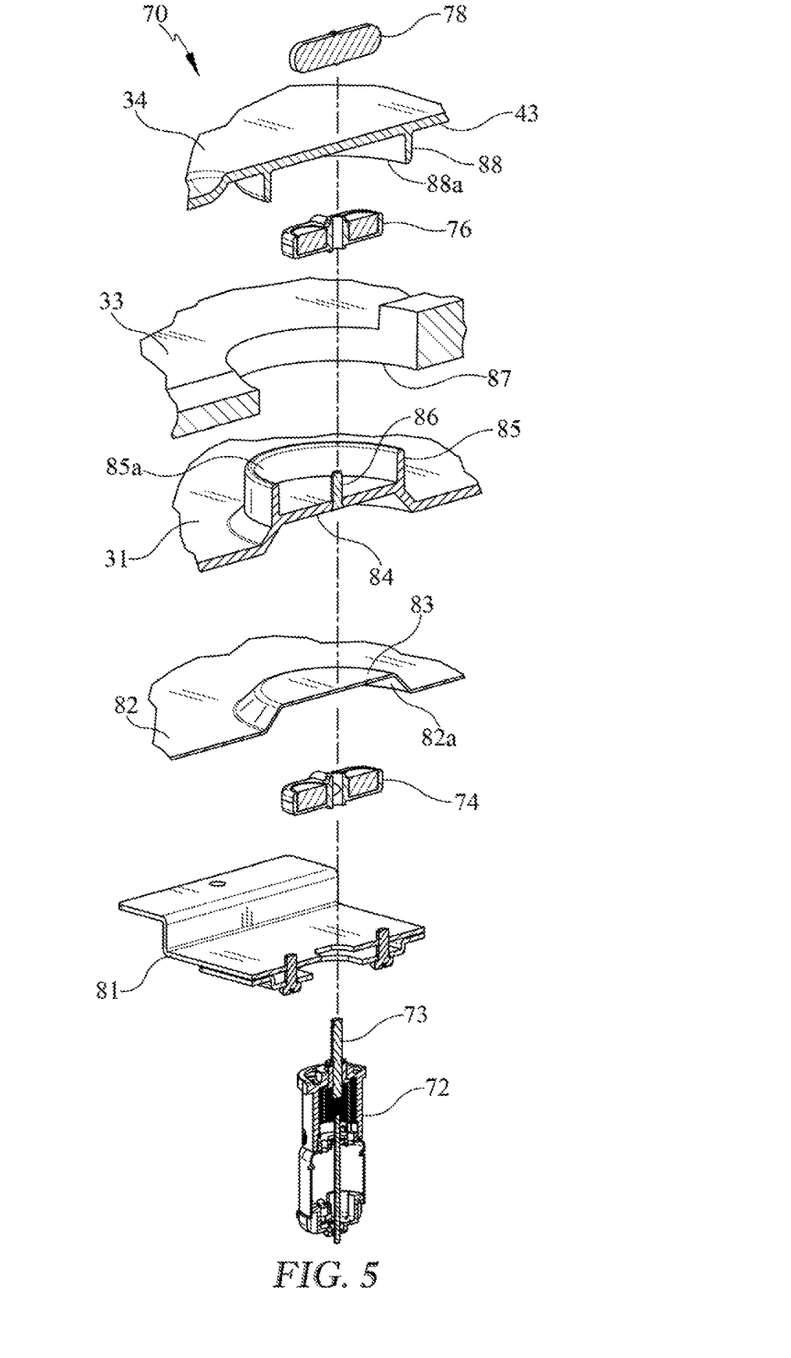
FIG. 5 is an exploded perspective view of the components of the agitator assembly of the exemplary satellite brewing system of FIG. 1.

Referring now to FIGS. 2, 2A, 4, and 5, in this exemplary satellite brewing system 10, there is an agitator assembly 70 to agitate and mix the brewed beverage within the internal beverage holding tank 34 when the shuttle 30 is positioned at the brewing station 20, which assists in maintaining the brewed beverage at a consistent temperature throughout the internal beverage holding tank 34. As part of the agitator assembly 70, a drive motor 72 and a drive magnet 74 are installed in the brewing station 20. Specifically, in this exemplary embodiment and as best shown in FIGS. 2A and 5, a mounting plate 81 is affixed to the underside of a support panel 82 of the brewing station 20. The drive magnet 74 is positioned in a cavity 82a defined between the mounting plate 81 and the support panel 82. The drive motor 72 is mounted below the mounting plate 81, with the axle 73 of the drive motor 72 extending through the mounting plate 81 where it engages the drive magnet 74. When the drive motor 72 is activated (as described below), the axle 73 rotates, and thus rotates the drive magnet 74 within the cavity 82a, as further discussed below.

As a further part of the agitator assembly 70, an intermediate drive magnet 76 is installed in the base of the shuttle 30, i.e., below and outside of the internal beverage holding tank 34. In this exemplary embodiment, the intermediate drive magnet 76 is installed between the bottom member 31 of the housing 36 and the bottom wall 43 of the internal beverage holding tank 34. Thus, the bottom member 31 of the housing 36 of the shuttle 30 includes a circular rim 85 that extends from the bottom member 31 and defines a cavity 85a. An axle 86 also extends upward from the bottom member 31 of the housing 36 in the center of the rim 85. The intermediate drive magnet 76 is positioned on this axle 86 and in the cavity 85a that is circumscribed by the rim 85, such that the intermediate drive magnet 76 is capable of rotating about the axle 86 within the cavity 85a.

Referring still to FIGS. 2A and 5, in this exemplary embodiment, the internal beverage holding tank 34 also includes a circular rim 88 that extends downward from its bottom wall 43 and defines a cavity 88a. The center of this cavity 88a is aligned with that of the cavity 85a that is circumscribed by the rim 85 that extends upward from the bottom member 31 of the housing 36. Thus, as shown in FIG. 2A, the rim 88 of the internal beverage holding tank 34 effectively fits around and mates with the rim 85 of the bottom member 31 of the housing 36, thus enclosing the intermediate drive magnet 76 in the cavity 85a between the bottom member 31 of the housing and the bottom wall 43 of the internal beverage holding tank 34. Furthermore, a hole 87 is defined in the insulating insert 33 to accommodate this construction.

Referring now to FIGS. 2, 2A, 3, and 5, in this exemplary embodiment, a raised portion 83 is formed in the support panel 82 of the brewing station 20, and a corresponding indentation 84 is defined in the bottom member 31 of the housing 36 (or bottom surface) of the shuttle 30. Thus, when the shuttle 30 is positioned at the brewing station 20, the indentation 84 defined by the bottom member 31 of the housing 36 of the shuttle 30 mates with the raised portion 83 formed in the support panel 82 of the brewing station 20. This configuration aids in seating and properly positioning the shuttle 30 at the brewing station 20. Furthermore, this configuration ensures that the agitator assembly 70 is properly aligned. Specifically, the drive magnet 74, which is positioned in the cavity 82a defined between the mounting plate 81 and the support panel 82, is aligned with the intermediate drive magnet 76, which is positioned in the cavity 85a that is circumscribed by the rim 85 that extends from the bottom member 31 of the housing 36 of the shuttle 30. Thus, when the shuttle 30 is positioned at the brewing station 20, the drive magnet 74 installed in the brewing station 20 is magnetically coupled to the intermediate drive magnet 76 installed in the shuttle 30 though the support panel 82 of the brewing station 20 and through the bottom member 31 of the housing 36 of the shuttle 30. Accordingly, rotation of the drive magnet 74 within the cavity 82a causes a corresponding rotation of the intermediate drive magnet 76 about the axle 86 within the cavity 85a.

Finally, and referring once again to FIGS. 2A and 5, the agitator assembly 70 includes a beverage agitator 78 that is positioned within the internal beverage holding tank 34. The beverage agitator 78 is magnetically coupled to the intermediate drive magnet 76 through the bottom wall 43 of the internal beverage holding tank 34. As a result, when the shuttle 30 is positioned at the brewing station 20, rotation of the drive magnet 74 by the drive motor 72 causes a corresponding rotation of the intermediate drive magnet 76 (as described above), which causes a corresponding rotation of the beverage agitator 78 within the internal beverage holding tank 34. Such agitation and mixing of the brewed beverage not only aids in maintaining a homogenous temperature throughout the brewed beverage, but also prevents any solids from settling at the bottom of the internal beverage holding tank 34. Furthermore, the agitator assembly 70 could also provide the necessary agitation and mixing to ensure that additives, such as flavorants and sweeteners that are added to the brewed beverage, are properly dispersed and dissolved into brewed beverage while it is held in the internal beverage holding tank 34 of the shuttle 30.

As an additional benefit, because the intermediate drive magnet 76 is located within the shuttle 30 itself, the beverage agitator 78 is retained within the internal beverage holding tank 34 by the intermediate drive magnet 76 even when the shuttle 30 is moved, for example, for draining and cleaning of the shuttle 30. In this regard, it is preferred that there be no electronics, controls, motors, or the like located on or within the shuttle 30 itself, so that the shuttle 30 could be completely submerged for cleaning without risk of damaging any electronics, controls, or motors.

As a further refinement, it is contemplated that, in some embodiments, the brewing station 20 includes a proximity switch (for example, a reed switch) which detects whether the shuttle 30 is positioned at the brewing station 20. When the shuttle 30 is positioned at the brewing station 20, the proximity switch closes, activating the drive motor 72, thus agitating and mixing the brewed beverage within the internal beverage holding tank 34 of the shuttle 30. Likewise, when the shuttle 30 is not so positioned at the brewing station 20, the proximity switch is open, and the drive motor 72 will not operate.

It is also contemplated that the beverage agitator 78 could operate at a fixed speed or at a variable speed. For example, in some embodiments, the drive motor 72 is a variable speed motor, which can be adjusted through various controls. To this end, and as shown in FIGS. 1, 2, and 3, the exemplary satellite brewing system 10 includes a display 25 located on a front surface of the brewing station 20 in order to provide information regarding the operation of the satellite brewing system 10 to a user and/or as an input means for the user to input instructions and control operation of the satellite brewing system 10.

One of ordinary skill in the art will recognize that additional embodiments are possible without departing from the teachings of the present invention. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the present invention.

What is claimed is:

1. A portable beverage dispensing container, comprising:
   a housing;
   an internal beverage holding tank positioned in and contained within the housing, the internal beverage holding tank configured to receive and store a beverage; and
   a dispensing nozzle on an external surface of the housing which is in fluid communication with the internal beverage holding tank;
   an intermediate drive magnet installed in a base of the portable beverage dispensing container below and outside of the internal beverage holding tank, wherein the intermediate drive magnet is configured for magnetic coupling to a drive magnet installed in a brewing station when the portable beverage dispensing container is positioned at the brewing station; and
   a beverage agitator that is positioned within the internal beverage holding tank and is magnetically coupled to the intermediate drive magnet through a bottom wall of the internal beverage holding tank, such that, in use, rotation of the intermediate drive magnet causes a corresponding rotation of the beverage agitator within the internal beverage holding tank.

2. The portable beverage dispensing container as recited in claim 1, wherein the housing includes a main body member, a bottom member, and an insulating insert contained substantially within the main body member.

3. The portable beverage dispensing container as recited in claim 2, wherein the intermediate drive magnet is positioned between the bottom member of the housing and the internal beverage holding tank.

4. The portable beverage dispensing container as recited in claim 2, wherein the housing includes a circular rim that extends upward from the bottom member and defines a cavity, with the intermediate drive magnet positioned in the cavity between the bottom member of the housing and the internal beverage holding tank.

5. The portable beverage dispensing container as recited in claim 4, wherein an axle extends upward from the bottom member of the housing in a center of the circular rim, with the intermediate drive magnet positioned on and rotating about the axle within the cavity.

6. The portable beverage dispensing container as recited in claim 4, wherein the internal beverage holding tank includes a circular rim that extends downward from the bottom wall of the internal beverage holding tank, which fits around and mates with the circular rim of the bottom member of the housing, thus enclosing the intermediate drive magnet in the cavity between the bottom member of the housing and the bottom wall of the internal beverage holding tank.

7. A satellite brewing system, comprising:
   a brewing station for producing a beverage;
   a shuttle that is selectively positioned at the brewing station to receive the beverage, which is stored in an internal beverage holding tank; and
   an agitator assembly, including
      a drive motor and a drive magnet installed in the brewing station,
      an intermediate drive magnet installed in a base of the shuttle below and outside of the internal beverage holding tank, wherein the intermediate drive magnet is magnetically coupled to the drive magnet when the shuttle is positioned at the brewing station, and
      a beverage agitator that is positioned within the internal beverage holding tank and is magnetically coupled to the intermediate drive magnet through a bottom wall of the internal beverage holding tank, such that, in use, when the shuttle is positioned at the brewing station, rotation of the drive magnet by the drive motor causes a corresponding rotation of the intermediate drive magnet, which causes a corresponding rotation of the beverage agitator within the internal beverage holding tank.

8. The satellite brewing system as recited in claim 7, wherein the shuttle includes a housing with main body member, a bottom member, and an insulating insert contained substantially within the main body member.

9. The satellite brewing system as recited in claim 8, wherein the intermediate drive magnet is positioned between the bottom member of the housing and the internal beverage holding tank.

10. The satellite brewing system as recited in claim 8, wherein the housing includes a circular rim that extends upward from the bottom member and defines a cavity, with the intermediate drive magnet positioned in the cavity between the bottom member of the housing and the internal beverage holding tank.

11. The satellite brewing system as recited in claim 10, wherein an axle extends upward from the bottom member of the housing in a center of the circular rim, with the intermediate drive magnet positioned on and rotating about the axle within the cavity.

12. The satellite brewing system as recited in claim 10, wherein the internal beverage holding tank includes a circular rim that extends downward from the bottom wall of the internal beverage holding tank, which fits around and mates with the circular rim of the bottom member of the housing, thus enclosing the intermediate drive magnet in the cavity between the bottom member of the housing and the bottom wall of the internal beverage holding tank.

13. The satellite brewing system as recited in claim 7, wherein the brewing station includes a support panel on which the shuttle is positioned, wherein a raised portion is formed in the support panel, and wherein a corresponding indentation is defined in a bottom surface of the shuttle that mates with the raised portion, thus properly positioning the shuttle at the brewing station.

14. A portable beverage dispensing container, comprising:

a housing;

an internal beverage holding tank positioned in and contained within the housing, the internal beverage holding tank configured to receive and store a beverage;

a dispensing nozzle on an external surface of the housing which is in fluid communication with the internal beverage holding tank;

an intermediate drive magnet installed in a base of the portable beverage dispensing container below and outside of the internal beverage holding tank, wherein the intermediate drive magnet is configured for magnetic coupling to a drive magnet installed in a brewing station when the portable beverage dispensing container is positioned at the brewing station; and a beverage agitator that is positioned within the internal beverage holding tank and is magnetically coupled to the intermediate drive magnet, with a bottom wall of the internal beverage holding tank physically separating the beverage agitator from the intermediate drive magnet, such that, in use, rotation of the intermediate drive magnet causes a corresponding rotation of the beverage agitator within the internal beverage holding tank.

* * * * *

UNITED STATES PATENT AND TRADEMARK OFFICE
CERTIFICATE OF CORRECTION

PATENT NO. : 10,376,094 B1  
APPLICATION NO. : 15/378323  
DATED : August 13, 2019  
INVENTOR(S) : Thomas Joseph Pfeifer and William Alexis Dahmen

Page 1 of 1

It is certified that error appears in the above-identified patent and that said Letters Patent is hereby corrected as shown below:

In the Claims

Claim 1, Column 5, Line 67, replace "tank configured to receive and store a beverage; and" with "tank configured to receive and store a beverage;"

Signed and Sealed this  
Seventeenth Day of March, 2020

Andrei Iancu  
*Director of the United States Patent and Trademark Office*